United States Patent
Wolf et al.

(10) Patent No.: US 12,109,970 B1
(45) Date of Patent: *Oct. 8, 2024

(54) RESTRAINT SYSTEM

(71) Applicant: Apple Inc., Cupertino, CA (US)

(72) Inventors: Philipp J. Wolf, Capistrano Beach, CA (US); Jesse T. Buehler, Portola Valley, CA (US); Adam J. Golman, Glen Allen, VA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,944

(22) Filed: Apr. 5, 2023

Related U.S. Application Data

(63) Continuation of application No. 17/549,189, filed on Dec. 13, 2021, now Pat. No. 11,654,858.

(60) Provisional application No. 63/146,418, filed on Feb. 5, 2021.

(51) Int. Cl.
| | |
|---|---|
| *B60R 21/232* | (2011.01) |
| *B60N 2/01* | (2006.01) |
| *B60R 21/01* | (2006.01) |
| *B60R 21/013* | (2006.01) |
| *B60R 21/214* | (2011.01) |
| *B60R 21/231* | (2011.01) |
| *B60R 21/2338* | (2011.01) |
| *B60R 22/48* | (2006.01) |

(52) U.S. Cl.
CPC .............. *B60R 21/232* (2013.01); *B60N 2/01* (2013.01); *B60R 21/013* (2013.01); *B60R 21/214* (2013.01); *B60R 21/2338* (2013.01); *B60R 22/48* (2013.01); *B60R 2021/01265* (2013.01); *B60R 2021/23161* (2013.01); *B60R 2022/4808* (2013.01)

(58) Field of Classification Search
CPC ........... B60R 2021/01265; B60R 2021/23153; B60R 2021/23161; B60R 2021/23192; B60R 2021/23386; B60R 2021/23388; B60R 21/013; B60R 21/06; B60R 21/08; B60R 21/214; B60R 21/232; B60R 21/2338; B60R 22/46; B60R 22/48; B60R 2022/4808; B60N 2/01; B60N 2/0292; B60N 2/14; B60N 2/143; B60N 2002/022
See application file for complete search history.

(56) References Cited

U.S. PATENT DOCUMENTS

| | | | |
|---|---|---|---|
| 3,687,485 A | 8/1972 | Campbell | |
| 3,774,936 A | 11/1973 | Barnett et al. | |
| 4,468,051 A | 8/1984 | Kobayashi | |
| 5,364,129 A | 11/1994 | Collins et al. | |
| 6,135,497 A * | 10/2000 | Sutherland | ............... B60R 21/08 |
| | | | 280/748 |
| 6,431,588 B1 * | 8/2002 | Bayley | .................. B60R 21/232 |
| | | | 280/730.2 |

(Continued)

FOREIGN PATENT DOCUMENTS

JP        2005096652 A  *  4/2005    ........... B60R 21/232

*Primary Examiner* — Laura Freedman
(74) *Attorney, Agent, or Firm* — Young Basile Hanlon & MacFarlane, P.C.

(57) ABSTRACT

A deployable restraint system including a panel, a tether coupled to the panel, and an actuator that moves the tether to deploy the panel. The panel and the tether are placed in tension between one of two sides of a compartment and a top of the compartment when the tether is moved by the actuator.

20 Claims, 7 Drawing Sheets

(56) References Cited

U.S. PATENT DOCUMENTS

| | | | |
|---|---|---|---|
| 6,722,691 B1 | 4/2004 | Haland et al. | |
| 7,000,944 B2 | 2/2006 | Bakhsh et al. | |
| 7,152,873 B2 | 12/2006 | Peng et al. | |
| 7,195,276 B2 | 3/2007 | Higuchi | |
| 7,380,853 B2 * | 6/2008 | Wells | B60R 21/12 |
| | | | 280/749 |
| 7,461,858 B2 | 12/2008 | Hirata | |
| 8,403,358 B2 | 3/2013 | Choi et al. | |
| 8,414,017 B2 | 4/2013 | Lee et al. | |
| 9,321,423 B2 | 4/2016 | Jaradi et al. | |
| 9,327,669 B2 | 5/2016 | Jaradi et al. | |
| 9,610,915 B2 | 4/2017 | Specht et al. | |
| 9,676,361 B2 | 6/2017 | Smith et al. | |
| 9,725,064 B1 | 8/2017 | Faruque et al. | |
| 9,994,182 B1 | 6/2018 | Jaradi et al. | |
| 10,246,043 B2 | 4/2019 | Schneider | |
| 10,279,770 B2 | 5/2019 | Faruque et al. | |
| 10,315,609 B2 | 6/2019 | Thomas | |
| 10,486,637 B2 | 11/2019 | Thomas et al. | |
| 10,589,708 B2 | 3/2020 | Cho et al. | |
| 10,625,701 B2 | 4/2020 | Cho et al. | |
| 10,647,286 B1 | 5/2020 | Dennis et al. | |
| 10,703,323 B2 | 7/2020 | Jost et al. | |
| 10,807,556 B2 | 10/2020 | Hill et al. | |
| 10,836,340 B2 | 11/2020 | Obayashi et al. | |
| 10,953,835 B2 | 3/2021 | Gould et al. | |
| 10,960,839 B2 | 3/2021 | Imura et al. | |
| 11,059,448 B2 | 7/2021 | Rutelin et al. | |
| 11,059,449 B2 | 7/2021 | Jayakar et al. | |
| 11,135,992 B2 | 10/2021 | Faruque et al. | |
| 11,186,246 B2 | 11/2021 | Min | |
| 11,214,227 B2 * | 1/2022 | Jayakar | B60R 21/232 |
| 11,267,431 B2 | 3/2022 | Sekizuka | |
| 11,279,311 B2 | 3/2022 | Schroeder et al. | |
| 11,332,094 B2 | 5/2022 | Farooq et al. | |
| 11,654,858 B1 * | 5/2023 | Wolf | B60R 22/48 |
| | | | 280/730.1 |
| 11,667,258 B1 * | 6/2023 | Golman | B60R 21/214 |
| | | | 280/728.1 |
| 11,702,029 B1 * | 7/2023 | Golman | B60R 21/2338 |
| | | | 280/743.2 |
| 2005/0001412 A1 | 1/2005 | Schneider et al. | |
| 2020/0391689 A1 | 12/2020 | Fischer et al. | |

\* cited by examiner

RESTRAINT SYSTEM

CROSS-REFERENCE TO RELATED APPLICATION(S)

This application is a continuation of U.S. patent application Ser. No. 17/549,189, filed Dec. 13, 2021, and claims priority to U.S. Provisional Application Ser. No. 63/146,418, filed Feb. 5, 2021, the contents of which are incorporated herein by reference.

TECHNICAL FIELD

This disclosure relates to restraint systems and, in particular, deployable restraint systems.

BACKGROUND

Conventional passenger vehicles include airbags, which are inflatable restraints that deploy upon detection of impacts to and/or high acceleration of the passenger vehicle. The airbag is inflated between a reaction surface of the vehicle and the passenger. A reaction surface is formed by a generally rigid structure of the vehicle, such as an instrument panel, pillar structure, roof, or seat back. As the passenger impacts the airbag, force is transferred by the airbag from the passenger to the reaction surface, such that the airbag functions to restrain the passenger.

In conventional passenger vehicles, seats are oriented for the passengers to face forward. For example, in a two-row vehicle, both a front row of seats and a rear row of seats face forward with the seat backs of the front row of seats being arranged between those passengers in the front row and those passengers in the rear row. The seat backs of the front row of seats may thereby function as a reaction surface for airbags intended to restrain passengers in the rear row of seats. In a three-row vehicle, each of front, middle, and rear rows of seats face forward with the seat backs of the front row and the middle row being arranged between those passengers in the front and middle rows and between those passengers of the middle and rear rows, respectively. The seat backs of the front row of seats and the middle row of seats may thereby function as reaction surfaces for airbags intended to restrain passengers in the middle and back rows of seats, respectively.

In new vehicles, alternative seating arrangements may include seats that are oriented for passengers to face both forward and rearward toward each other. For example, in a two-row vehicle, a front row of seats may face rearward, while a rear row of seats faces forward with a generally open volume between the front and rear passengers. As a result, no seat structure (e.g., no seat back) or other vehicle structure may be arranged between those passengers in the front row and the back row to form a reaction surface.

SUMMARY

Disclosed herein are implementations of passenger vehicles and restraint systems.

In an implementation, a vehicle includes a vehicle body, seats, and a deployable restraint system. The vehicle body includes a floor, a roof, and two sides that cooperatively define a passenger compartment. The seats are positioned in the passenger compartment. At least one of the seats is arranged in a front row and faces rearward. At least one other of the seats is arranged in a rear row and faces forward toward the front row. The deployable restraint system includes a panel and a panel actuator that deploys the panel. The panel extends inboard along the roof when stored. The panel is placed in tension between one of the sides and the roof when deployed by the panel actuator.

The panel may, when deployed by the panel actuator, transfer force to and be placed in tension between upper tension locations at the roof and a lower outboard tension location at one of the two sides but not the other of the two sides. The upper tension locations may include an upper inboard tension location that is further from the one of the two sides than the other of the two sides. An upper end of the panel may be fixedly coupled to the roof at the upper tension locations to transfer force thereto. A lower end of the panel may be coupled to a tether that transfers force to the lower outboard tension location. The panel actuator may move the tether to pull the lower end of the panel downward. The deployable restraint system may further include an inflatable cushion and a cushion actuator that deploys the inflatable cushion by inflating the cushion. The inflatable cushion may extend inboard along the roof when stored and/or may be deployed between the panel and a seat back of the at least one seat in the rear row. When both of the panel and the inflatable cushion are deployed, the inflatable cushion may extend below the panel.

The vehicle may include another deployable restraint system. The deployable restraint system may be associated with a first seating position of the rear row and the other deployable restraint system may be associated with a second seating position of the rear row. The panels of the deployable restraint system and the other deployable restraint systems may be placed in tension between the roof and different ones of the two sides.

The vehicle may further include a restraint control system that includes a motion sensor and a controller. The controller may operate the panel actuator and the cushion actuator according to the motion sensor. The controller may operate the panel actuator before the cushion actuator.

The vehicle may further include a seatbelt and a seatbelt actuator that is operated to increase tension in the seatbelt. The controller may further operate the seatbelt actuator according to the motion sensor.

The deployable restraint system may further include a second panel actuator that deploys the panel. The panel may be placed in tension between the two sides and the roof when deployed by the panel actuator and the second panel actuator.

In an implementation, a deployable restraint system for a passenger vehicle includes a reaction panel, a panel actuator that deploys the reaction panel, a cushion, and a cushion actuator that deploys the cushion. When both the reaction panel and the cushion are deployed, the panel is configured to be placed in tension between a roof and only one of two sides of a passenger vehicle and transfer force from the cushion to the roof and the one of the two sides.

The deployable restraint system may further include a controller that operates the panel actuator and the cushion actuator to deploy the reaction panel before deploying the cushion. The cushion may be configured to deploy rearward of the reaction panel relative to a forward direction of travel of the passenger vehicle. A lower end of the reaction panel may be configured to couple to the one of the sides with a tether that is moved by the panel actuator. An upper end of the reaction panel may be configured to fixedly couple to the roof.

In an implementation, a method is provided for restraining a passenger in a passenger vehicle. The method generally includes deploying a panel to extend between a roof and a side of a vehicle body of the passenger vehicle and deploying an inflatable cushion between the panel and the passenger to transfer force from the passenger to the panel and, in turn, to the roof and the side of the vehicle body.

The deploying of the inflatable cushion may be performed after the deploying of the panel is initiated. The method may further include assessing a seating position of the passenger vehicle and/or assessing motion of the passenger vehicle. The deploying of the panel and the deploying of the inflatable cushion may be performed according to the assessing of the seating position and/or the assessing of the motion of the passenger vehicle. The side may be one of two sides of the vehicle body, and the deploying of the panel may include deploying the panel to extend between the roof and the side but not a second of the two sides.

DETAILED DESCRIPTION

Figure 1A:
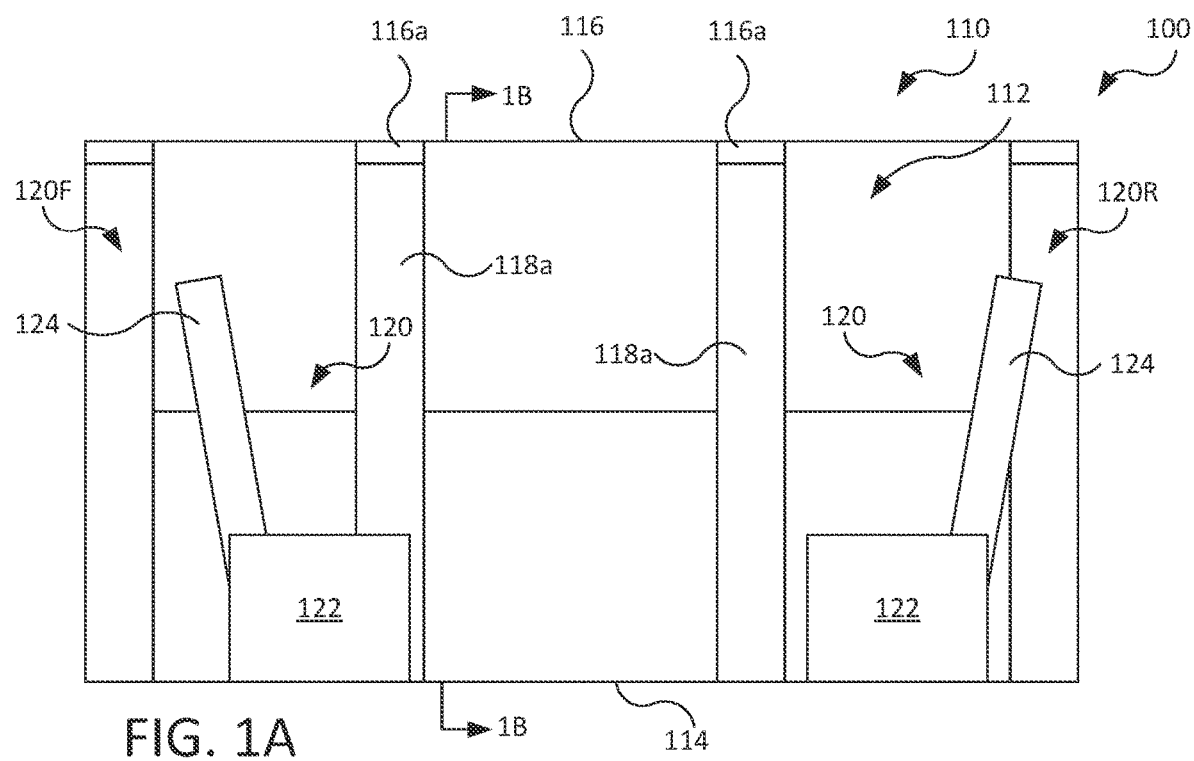
FIG. 1A is a side view of a passenger compartment of a passenger vehicle.
Figure 1B:
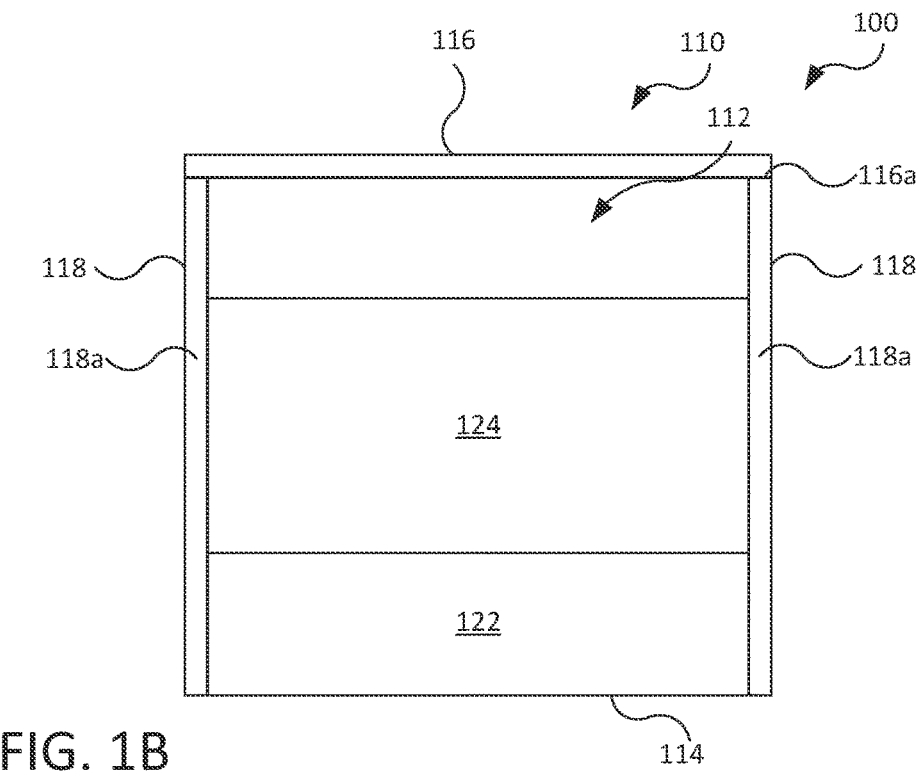
FIG. 1B is a cross-sectional view of the passenger compartment of the vehicle taken along line 1B-1B in FIG. 1A.

Referring to FIGS. 1A and 1B, a passenger vehicle 100 generally includes a vehicle body 110 that defines a passenger compartment 112. The vehicle body 110 generally includes a floor 114, a roof 116, sides 118, and doors (not shown), which cooperatively define the passenger compartment 112 therebetween. The vehicle body 110 may be structurally configured by way of individual structures of the floor 114, the roof, 116, and the sides 118 and cooperative configurations thereof for energy dispersion and to maintain the shape of the passenger compartment 112 in the event of an impact with the vehicle body 110.

The roof 116 generally forms the ceiling of the passenger compartment 112. The roof 116 may include one or more cross structures 116a that extend laterally across the vehicle body 110 (i.e., in an inboard-outboard direction), which are configured to substantially maintain the shape of the passenger compartment 112 during normal usage (e.g., providing torsional rigidity to the vehicle body 110) and impact events (e.g., rollovers). For example, as shown, the roof 116 may include front, rear, and two middle ones of the cross structures 116a. The roof 116 may be entirely opaque or may include transparent portions (e.g., windows) arranged between the cross structures 116a. To distinguish between different ones of the cross structures 116a, the cross structures 116a may be identified according to position (e.g., a front cross structure) and/or numerically (e.g., a first cross structure or a first middle cross structure).

As used herein, the directional terms "forward," "front," or similar refer to a primary direction of travel of the passenger vehicle 100. The directional terms "rearward," "rear," or similar refer to a secondary direction of travel of the passenger vehicle 100.

The sides 118 generally include left and right sides of the vehicle body 110. The sides 118 extend downward from the roof 116 to the floor 114 or other lower structure to support the roof 116 above the floor 114. The sides 118 may, for example, include lower opaque portions that include various structures for energy dispersion during impacts and may also include upper transparent portions (e.g., windows) that allow passengers to view outside the passenger compartment 112. The sides 118 may further include one or more pillar structures 118a, which are structures that are upwardly elongated and extend to the roof 116, for example, at corresponding locations to the cross structures 116a thereof. Between the pillar structures 118a may be positioned one or more doors (not labeled) that allow passengers to enter into and exit from the passenger compartment. Furthermore, the upper transparent portions (e.g., windows) may be arranged between the pillar structures 118a. As shown, each of the sides 118 may generally include front, rear, and two middle ones of the pillar structures 118a. As with the cross structures 116a of the roof 116, to distinguish between different ones of the pillar structures 118a, the pillar structures 118a may be identified according to position (e.g., a front pillar structure) and/or numerically (e.g., a first pillar structure or a first middle pillar structure). The pillar structures 118a may also be referred to as pillars or upright structures.

The passenger vehicle 100 further includes seats 120 positioned in the passenger compartment 112 of the vehicle body 110. For example, the passenger vehicle 100 may include one or more of the seats 120 in each of a front row 120F and a rear row 120R. Each of the seats 120 includes a seat bottom 122 and a seat back 124. Each of the seats 120 may be configured to provide one seating position for one passenger (e.g., being a bucket seat) or may be configured to provide multiple seating positions adjacent to each other (e.g., being bench seats). For example, the passenger vehicle 100 may include two front bucket seats (each providing one seating position) and one rear bench seat (e.g., providing three seating positions). At each seating position, the passenger vehicle 100 further includes a seatbelt restraint (discussed below). To distinguish between different ones of the seats 120, the seats 120 may be identified positionally (e.g., a front seat or a front right seat) and/or numerically (e.g., a first seat or a first rear seat).

The seats 120 are configured, or are reconfigurable, for the passengers to face each other. As shown, the seats 120 in the front row 120F, and the passengers seated thereon, face rearward toward the rear row 120R of the seats 120. The seats 120 in the rear row 120R and the passengers seated thereon, face forward toward the front row 120F of the seats 120. As a result, the passengers seated in each of the seats 120 of the front row 120F and rear row 120R are positioned between the seat backs 124 of the seats 120 of both the front row 120F and the rear row 120R, while no seatbacks are positioned between the passengers. Those seats 120 facing rearward (e.g., in the front row 120F) may also be referred to as rear-facing seats, while those seats 120 facing forward (e.g., in the rear row 120R) may also be referred to as forward-facing seats.

Figure 2A:
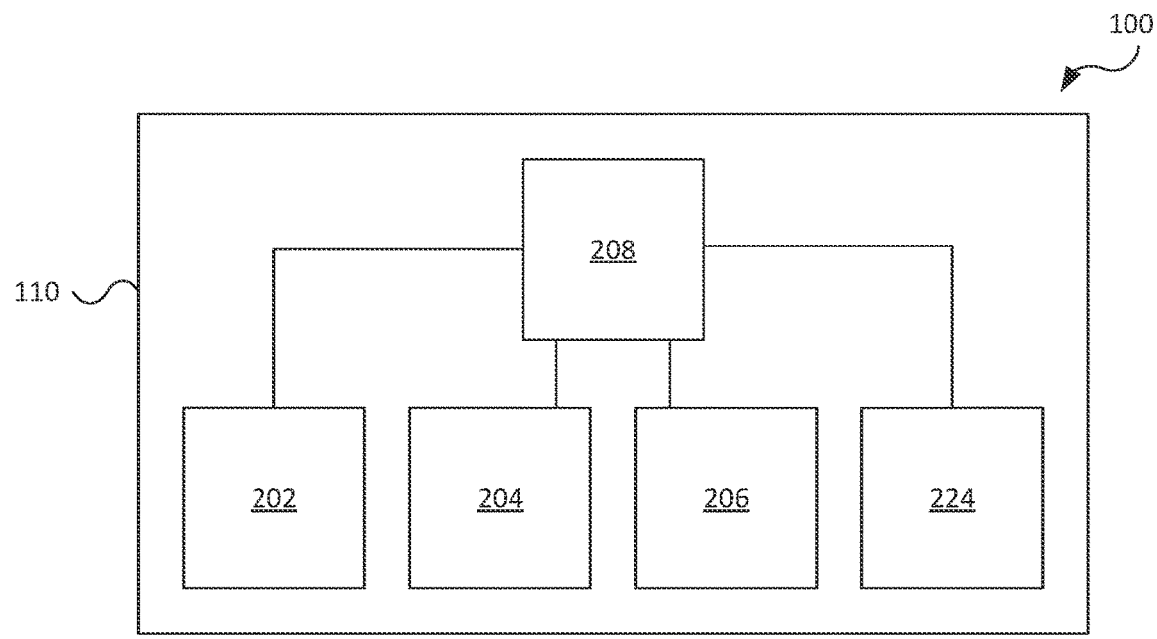
FIG. 2A is a schematic view of the passenger vehicle and various systems thereof.

Referring additionally to FIG. 2A, the passenger vehicle 100 additionally includes systems and components for traversing the passenger vehicle 100 along a roadway. For example, the passenger vehicle 100 includes a drive system 202 for propelling the passenger vehicle 100 (e.g., batteries, motors, gearboxes, drivelines, and wheels), a steering system 204 (e.g., motors and steering gears for pivoting the wheels), a braking system 206 (e.g., friction brakes for slowing rotation of the wheels), a control system 208 (i.e., for operating the drive system 202, the steering system 204, and the braking system 206), and an active restraint system 224, which are operatively coupled to the vehicle body 110. In a preferred example, the passenger vehicle 100 is configured as an autonomous vehicle by which the control system operates the drive system 202, the steering system 204, and the braking system 206 to traverse roadways with the passenger vehicle 100 and avoid obstacles between origins and destinations as requested by passengers without direct control thereof by the passenger. In such case, the control system 208 includes various sensors for observing the environment (e.g., cameras, light detection and ranging (LIDAR) sensors, and/or radar sensors), for locating the passenger vehicle 100 in real space (e.g., global positioning or other navigation systems, along with the environmental sensors), and for detecting motion of the passenger vehicle 100 (e.g., gyroscopes and/or accelerometers).

Figure 2B:
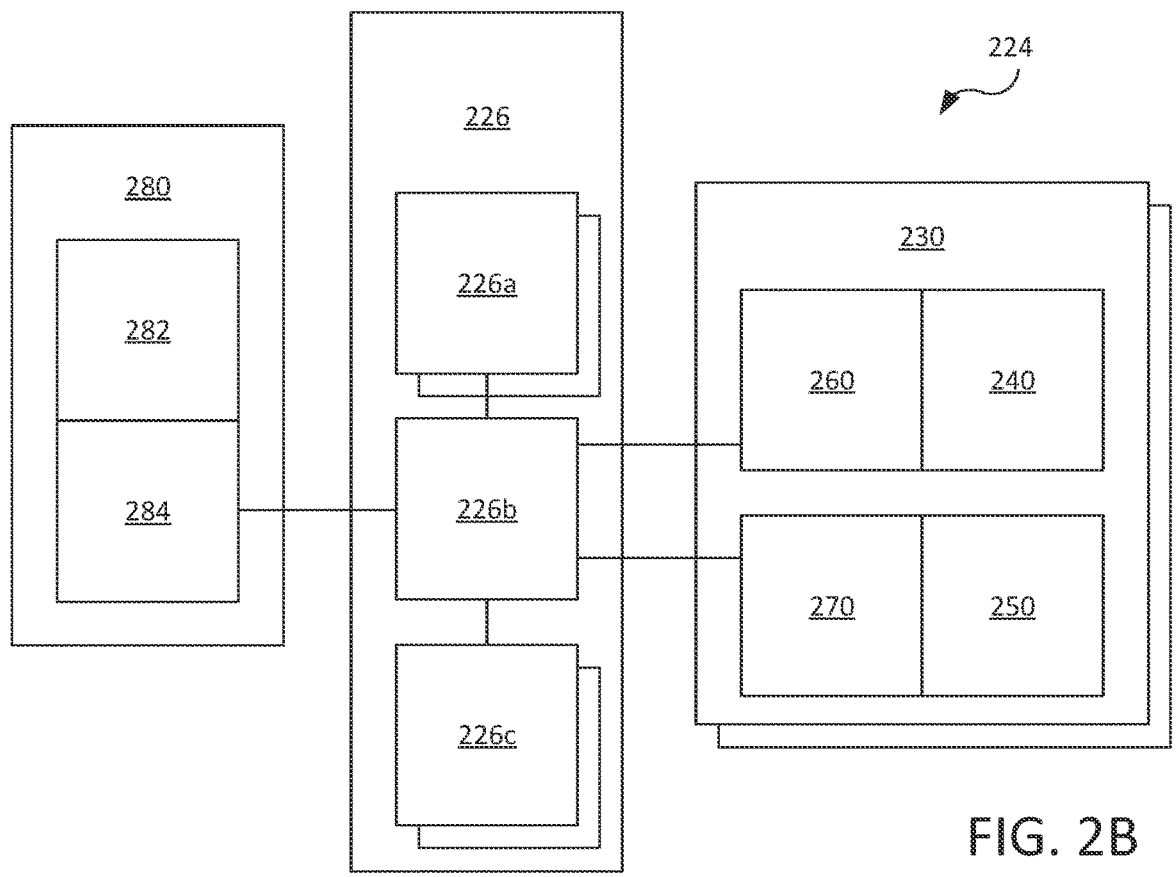
FIG. 2B is a schematic view of a restraint system of the vehicle.

Referring to FIG. 2B, the active restraint system 224 generally includes a restraint control system 226 and one or more deployable restraint systems 230. Each of the one or more deployable restraint systems 230 is associated with one of the seats 120, or seating positions thereon, to restrain a passenger therein. For example, one or more of the deployable restraint systems 230 (e.g., two) may be associated with the seat 120 in the rear row 120R, as discussed in detail below, to restrain the passengers in left and right seating positions. However, it should be understood that one or more of the deployable restraint systems 230 may or may not be associated with those seating positions in the front row 120F. The active restraint system 224 may also be considered to include a seatbelt system 280 associated with each of the seating positions, which includes a seatbelt 282 and a seatbelt actuator 284. The seatbelt actuator 284 is a pretensioning device, which, when controlled by the restraint control system 226, increases tension in the seatbelt 282 to limit motion of the passenger. The seatbelt actuator 284 may, for example, be a motor-operated retractor (e.g., capable of multiple uses) or a pyrotechnic or spring-operated device (e.g., capable of a single use).

Each of the deployable restraint systems 230 generally includes a reaction panel 240 and an inflatable cushion 250, along with a panel actuator 260 for deploying the reaction panel 240 and a cushion actuator 270 for deploying the inflatable cushion 250. When the deployable restraint system 230 is deployed, the reaction panel 240 forms a reaction surface for the inflatable cushion 250. More particularly, the reaction panel 240 is deployed and placed in tension between the roof 116 and one of the sides 118, while the inflatable cushion 250 is deployed and inflated between the reaction panel 240 and the passenger. As the passenger and the inflatable cushion 250 impact each other, force is transferred to the reaction panel 240 by the inflatable cushion 250 and, in turn, to the roof 116 and the side 118 of the vehicle body 110 of the passenger vehicle 100. The deployable restraint system 230 thereby restrains the passenger in the seat 120. To distinguish between the one or more deployable restraint systems 230 and components thereof, such systems and components may be identified numerically (e.g., a first deployable restraint system or a first reaction panel) and/or positionally (e.g., a rear, left deployable restraint system or a rear, left reaction panel). The reaction panel 240 may also be referred to as a panel, sail panel, or flexible panel. The inflatable cushion 250 may also be referred to as cushion or an airbag.

The restraint control system 226 generally includes one or more motion sensors 226a and a controller 226b in communication with the one or more motion sensors 226a, as well as the panel actuator 260 and the cushion actuator 270 of the deployable restraint system 230. Upon detection of motion with the motion sensors 226a indicative of an impact, or other high-acceleration event of the passenger vehicle 100, the controller 226b operates the panel actuator 260 to deploy the reaction panel 240 and the cushion actuator 270 to deploy the inflatable cushion 250. The one or more motion sensors 226a may, for example, include one or more accelerometers. The one or more motion sensors 226a may be the same or otherwise used with the control system 208, as described previously.

The restraint control system 226 may further include one or more passenger sensors 226c in communication with the controller 226b, which are configured to detect, classify, and/or identify passengers in the one or more seats 120. For example, the controller 226b may not operate one or more of the deployable restraint systems 230 if no passenger is detected in the seat 120 associated with the deployable restraint system 230 or if the passenger is detected or otherwise identified as being below a size threshold (e.g., below the weight and/or height of a 5th percentile adult) and/or being out of a suitable position for deployment. The one or more passenger sensors 226c may, for example, include cameras and machine vision programming or pressure sensors. The restraint control system 226 may be considered part of the control system 208.

An exemplary hardware configuration for the controller 226b is discussed in further detail below with respect to FIG. 7.

The reaction panel 240 is shown as a flexible panel formed, for example, of material also used for airbag cushions, such as a woven nylon material. The reaction panel 240 is not inflatable. When deployed, the reaction panel 240 forms a reaction surface for the inflatable cushion 250. In the deployed state, reaction panel 240 extends between the roof 116 of the vehicle body 110 and the side 118 of the vehicle body 110. The reaction panel 240 extends downward from the roof 116 of the vehicle body 110. The reaction panel 240 may also extend inward from the side 118 of the vehicle body 110. When deployed and/or impacted, such as with the inflatable cushion 250, the reaction panel 240 may be in tension between the roof 116 and the side 118 of the vehicle body 110, thereby transferring force to the roof 116 and the side 118.

Figure 3A:
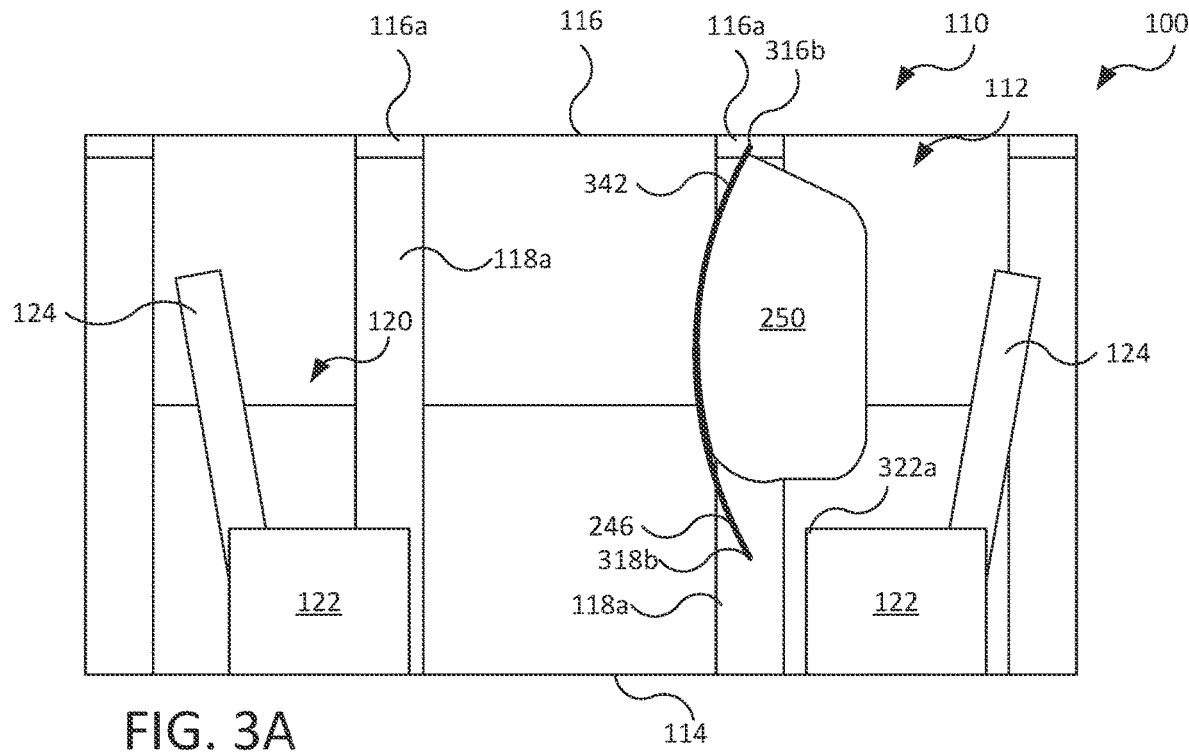
FIG. 3A is the side view of the passenger compartment of FIG. 1A with deployable restraint systems in deployed states.
Figure 3B:
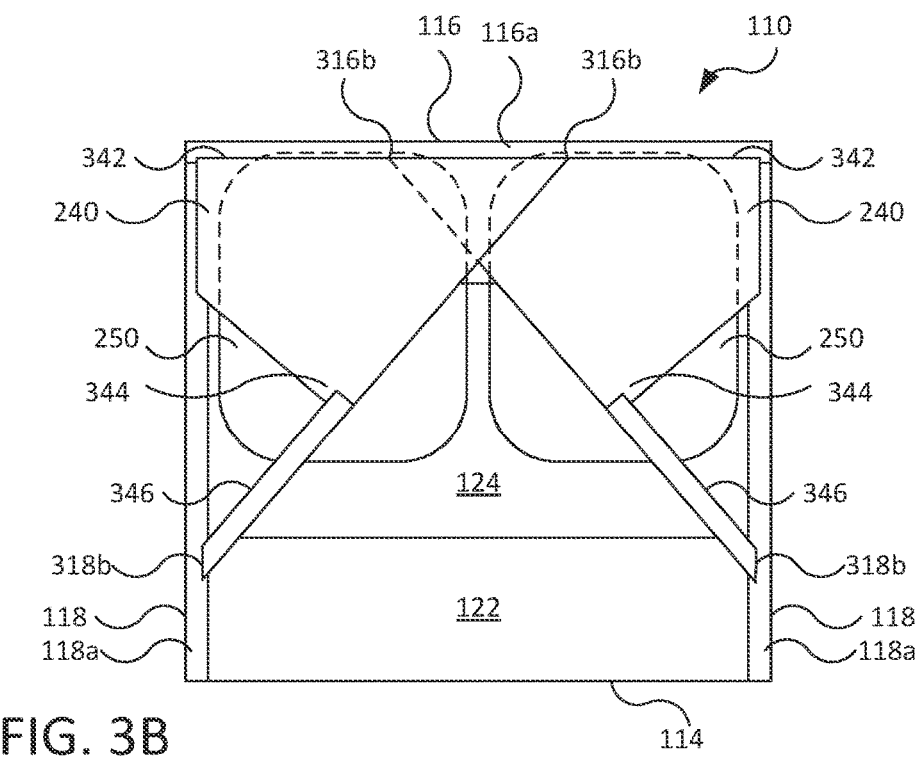
FIG. 3B is the cross-sectional view of the passenger compartment of FIG. 1B with the deployable restraint systems in the deployed states.

Referring to FIGS. 3A and 3B, an upper end 342 of the reaction panel 240 is placed in tension at the roof 116 at one or more tension locations there along. A tension location is a location of the vehicle body 110 at which the reaction panel 240 transfers force to the vehicle body 110 and is thereby placed in tension. Thus, the reaction panel 240 may further be considered to be placed in tension by the tension locations and/or that portion of the vehicle body 110 at which the tension location is located (e.g., the reaction panel 240 may be placed in tension by and between the tension locations and/or the roof 116 and the side 118 of the vehicle body 110). Tension locations may include those locations at which the reaction panel 240 is fixedly (e.g., immovably) coupled to the vehicle body 110 (e.g., to the roof 116, such as the cross structure 116a thereof), or those locations toward which the reaction panel 240 is pulled (e.g., the side 118). The tension locations of the upper end 342 of the reaction panel 240 include an upper inboard tension location 316b, which is an upper tension location furthest from the side 118 of the vehicle body 110 that forms a lower outboard tension location 318b (discussed below). The upper end 342 of the reaction panel 240 may be fixedly coupled to the roof 116 at the upper inboard tension location 316b. Upper tension locations may include additional locations at which the upper end 342 of the reaction panel 240 transfers force to (e.g., if fixedly coupled to) the roof 116 between the upper inboard tension location 316b and the side 118 that forms the lower outboard tension location 318b.

The upper inboard tension location 316b may, for example, be positioned at or laterally beyond a mid-point of the roof 116 (e.g., closer to the other one of the sides 118). For example, the upper inboard tension location 316b may be at 50%, 60%, 70%, or more of a maximum width of the passenger vehicle 100 inward from the side 118 forming the lower outboard tension location 318b. The upper inboard tension location 316b may also be arranged forward of the seat back 124 of the seat 120 associated with the deployable restraint system 230, for example, approximately at a forward edge 322a thereof (e.g., within 300 mm), forward of the forward edge 322a and approximately or substantially at the forward edge 322a, or rearward of the forward edge 322a and approximately or substantially at the forward edge 322a. The forward edge 322a may be a forwardmost surface of the seat bottom 122.

In the case of the active restraint system 224 including two of the deployable restraint systems 230, each being associated with one of the seats 120 or one of multiple seating positions in the rear row 120R, the upper inboard tension location 316b may be nearer to that side 118 of the vehicle body 110 opposite the seating location (i.e., that side not forming the lower outboard tension location 318b). As a result, when deployed, the reaction panels 240 of the two deployable restraint systems 230 may overlap in the lateral direction (i.e., inboard-outboard direction; underlying portions depicted in dashed lines). Furthermore, to accommodate the overlap of the reaction panels 240, the upper inboard tension location 316b of one of the deployable restraint systems 230 may be positioned forward of the upper inboard tension location 316b of the other of the deployable restraint systems 230. In the case of the rear row 120R including one or more of the seats 120 that cooperatively provide three seating positions in the rear row 120R (e.g., left, middle, and right seating positions), the active restraint system 224 may include two of the deployable restraint systems 230, one associated with each of the left and right seating positions but not one associated with the middle seating position.

A lower end 344 of the reaction panel 240 is coupled to or otherwise put in tension with the side 118 of the vehicle body 110. More particularly, when deployed, the reaction panel 240 is placed in tension between a lower outboard tension location 318b on the side 118 of the vehicle body 110, the upper inboard tension location 316b, and other tension locations at which the upper end 342 of the reaction panel 240 is coupled to the roof 116 and/or the side 118. For example, as shown, a tether 346 (e.g., a strap) is coupled to and extends from the lower end 344 of the reaction panel 240 to the lower outboard tension location 318b on the side 118 of the vehicle body 110. During deployment, the panel actuator 260 pulls the tether 346, so as to draw the lower end 344 of the reaction panel 240 downward and toward the lower outboard tension location 318b. Deployment and the panel actuator 260 are discussed in further detail below with respect to FIGS. 4A to 4C. The tether 346 may be made from the same material as the reaction panel 240 or another material that may have different material properties, for example, being less extensible in tension (e.g., a higher denier nylon material).

The lower outboard tension location 318b may, for example, be positioned approximately at a height of the seat bottom 122 of the seat 120 nearest thereto (e.g., within 300 mm thereof), substantially at the height of the seat bottom 122 (e.g., within 100 mm thereof), above the seat bottom 122 and approximately or substantially at the height of the seat bottom 122, or below the seat bottom 122 and approximately or substantially at the height of the seat bottom 122. The height of the seat bottom 122 may be a maximum height of the seat bottom 122 at a location moving directly inboard from the side 118, a maximum height of the seat bottom 122 at an edge furthest from the seat back 124 (e.g., the forward edge 322a of the seat bottom 122 of the seat 120 in the rear row 120R), or an overall maximum height of the seat bottom 122. The lower outboard tension location 318b may also be arranged forward of the seat back 124 of the seat 120 associated with the deployable restraint system 230, for example, approximately at the forward edge 322a thereof (e.g., within 300 mm), substantially at the forward edge 322a thereof (e.g., within 300 mm thereof), forward of the forward edge 322a and approximately or substantially at the forward edge 322a, or rearward of the forward edge 322a and approximately or substantially at the forward edge 322a.

Figure 3C:
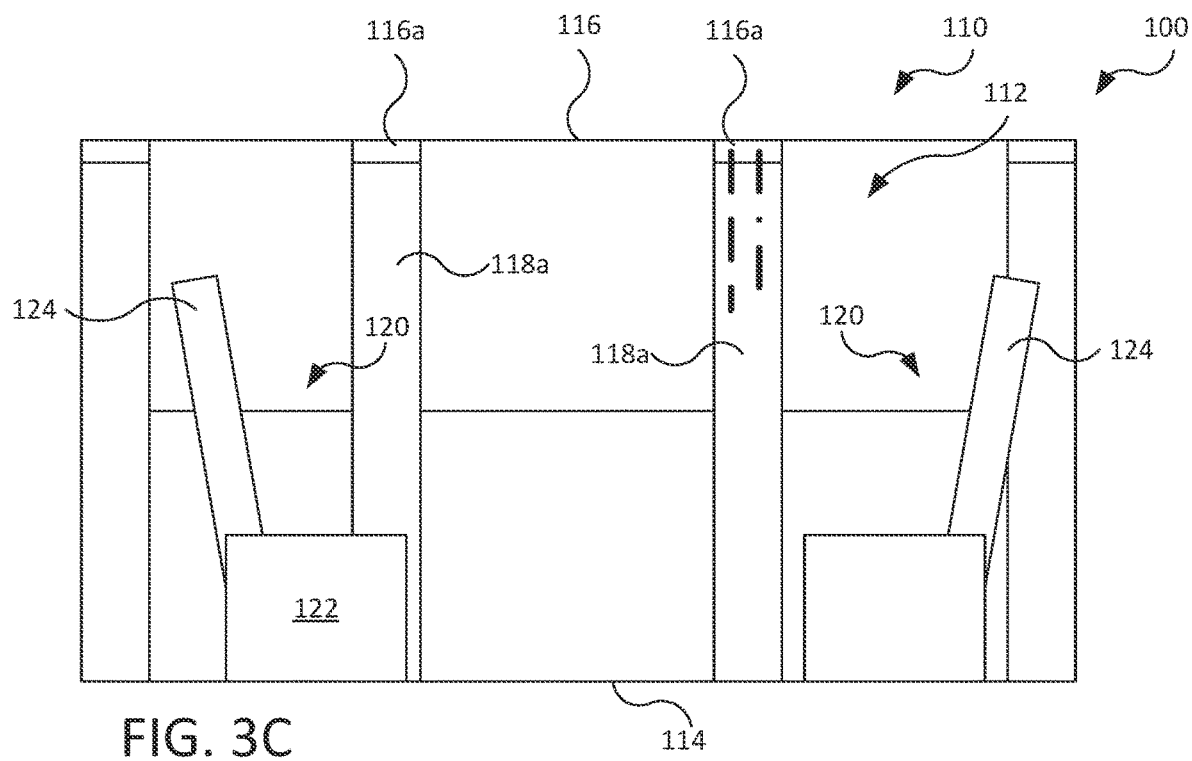
FIG. 3C is the side view of the passenger compartment of FIG. 1A with the deployable restraint systems depicted schematically and in non-deployed states and hidden from view (illustrated as dash-dash and dash-dot lines).
Figure 3D:
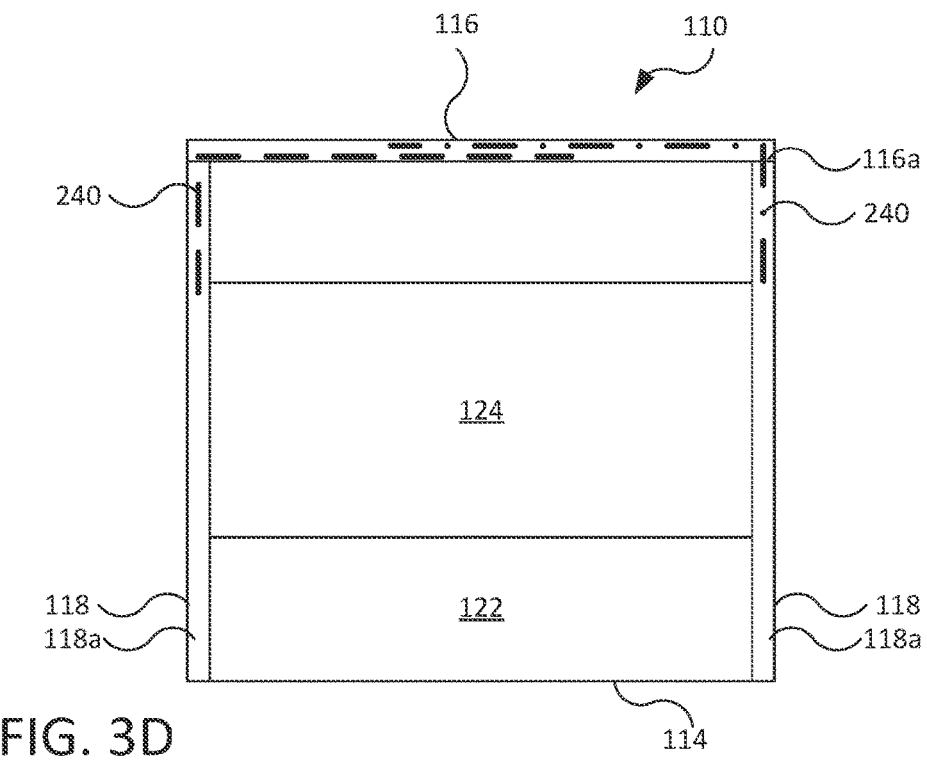
FIG. 3D is the cross-sectional view of the passenger compartment of FIG. 1B with the deployable restraint systems in the non-deployed states and hidden from view (illustrated as dash-dash and dash-dot lines).

Referring additionally to FIGS. 3C-3D, prior to deployment, the reaction panel 240 (including the tether 246 thereof) is hidden from view, for example, behind trim panels or other covers associated with the roof 116 (e.g., the cross structure 116a) and/or one of the sides 118 (e.g., a middle one of the pillar structures 118a). For example, when stored, the reaction panel 240 may be folded (e.g., pleated) and/or rolled to be in a compact elongated form that extends laterally at least partially across the roof 116 (e.g., along the cross structure 116a). When stored, the reaction panel 240 may further extend downward from the roof 116 partially along the side 118 (e.g., along the pillar structure 118a). In FIGS. 3C and 3D, the reaction panels 240 (including the tethers 246) are illustrated schematically in heavy broken lines. The inflatable cushions 250 are omitted for clarity but may be positioned rearward of the reaction panel 240 of the deployable restraint system 230 associated with the same seating position.

During deployment, the reaction panel 240 is pulled downward to be placed in tension between the upper inboard tension location 316b along the roof 116 of the vehicle body 110, any other upper tension locations, and the lower outboard tension location 318b along the side 118 of the vehicle body 110 by the panel actuator 260. The panel actuator 260 may be any suitable actuator configured to pull or otherwise move the tether 346 to pull the lower end 344 of the reaction panel 240 downward in a rapid manner to be in tension with the lower outboard tension location 318b.

Figure 4A:
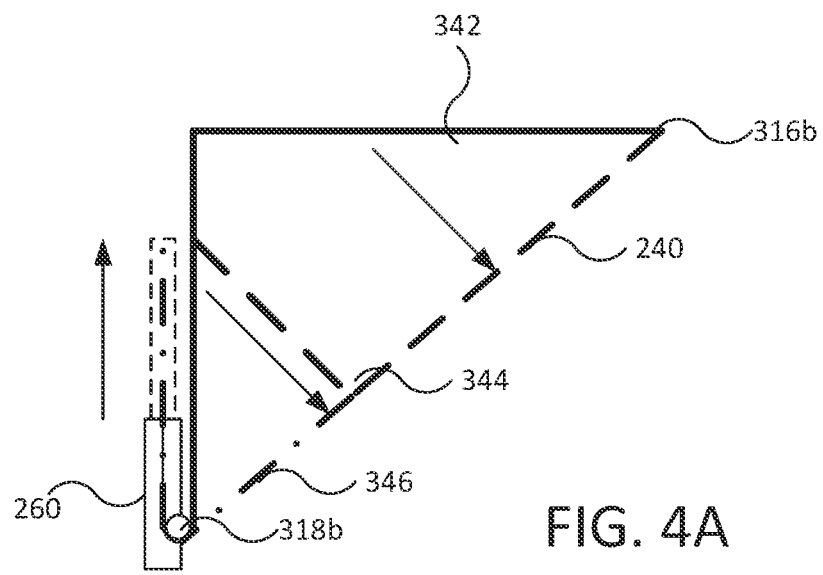
FIG. 4A is a front schematic view of a reaction panel and actuator of a first embodiment of the deployable restraint system in the non-deployed state (solid lines) and the deployed state (dash-dash and dash-dot lines).
Figure 4B:
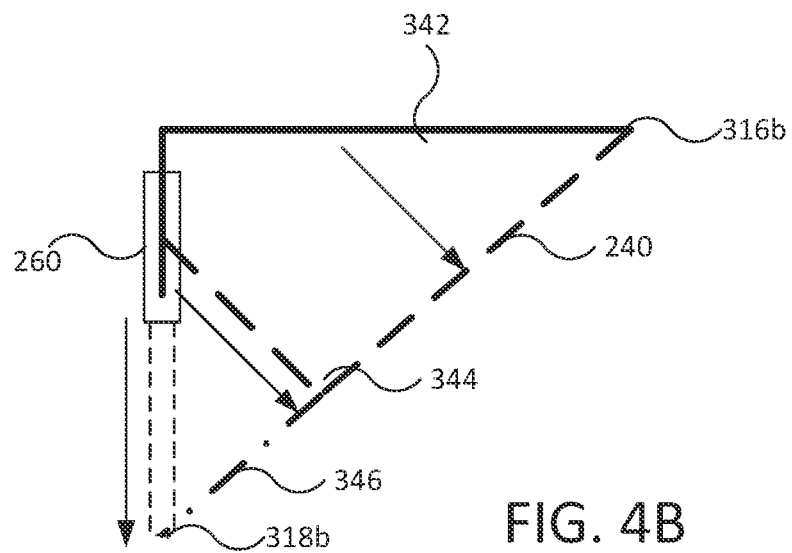
FIG. 4B is a front schematic view of a reaction panel and actuator of a second embodiment of the deployable restraint system in the non-deployed state (solid lines) and the deployed state (dash-dash and dash-dot lines).
Figure 4C:
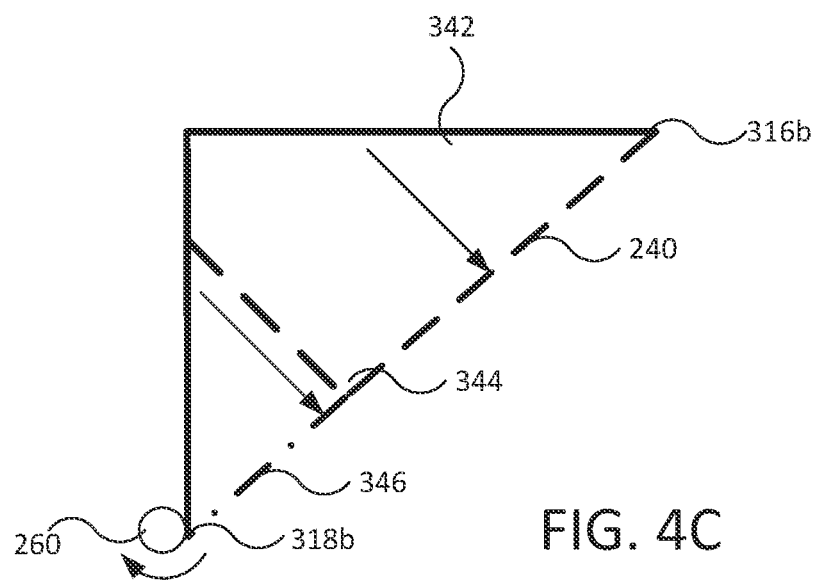
FIG. 4C is a front schematic view of a reaction panel and actuator of a third embodiment of the deployable restraint system in the non-deployed state (solid lines) and the deployed state (dash-dash and dash-dot lines).

Referring to FIGS. 4A to 4C, when the panel actuator 260 is operated, the lower end 344 of the reaction panel 240 is pulled downward, being removed from its stored position and state, and pulled into tension between the upper inboard tension location 316b and the lower outboard tension location 318b. The action of pulling the reaction panel 240 may function to break or otherwise move any trim panel or other covering that might be positioned over the reaction panel 240 and/or the inflatable cushion 250 when stored. In each of FIGS. 4A to 4C, the reaction panel 240 and the tether 346 are shown in thick solid lines in the stored position and in thick dash-dash and dash-dot lines, respectively, in the deployed positions.

Referring to FIGS. 4A, 4B, and 4C the panel actuator 260 is a linear actuator that moves the tether 346, so as to pull the reaction panel 240 downward into tension at the lower outboard tension location 318b. When configured as a linear actuator, the panel actuator 260 may, for example, include a piston in a cylinder or other sliding device (e.g., runner in a track) operated with pyrotechnics, compressed gas, or a spring. For example, as shown in FIG. 4A, a distal end of the slide mechanism may be fixedly coupled to an end of the tether 346 (see, e.g., FIG. 3A) that pulls the end of the tether 346 to the lower outboard tension location 318b. In another example, as shown in FIG. 4B, the end of the tether 346 is fixedly coupled to the vehicle body 110 (e.g., the side 118) and the distal end of the panel actuator 260 (e.g., having a pulley) engages and draws an intermediate portion of the tether 346 to the lower outboard tension location 318b. Referring to FIG. 4C, the panel actuator 260 may be a rotary actuator that winds the tether 346 thereabout.

Referring again to FIGS. 3A to 3B, the inflatable cushion 250 includes one or more flexible panels that cooperatively define a chamber that is inflated by the cushion actuator 270. The panels of the inflatable cushion 250 may, for example, be formed of conventional material used for airbag cushions, such as a woven nylon material.

When deployed, the inflatable cushion 250 is inflated between the reaction panel 240 and the seat back 124 of the seat 120 associated with the deployable restraint system 230 and between the reaction panel 240 and a passenger seated on the seat 120 associated with the deployable restraint system 230. When inflated and/or impacted by the passenger, the inflatable cushion 250 transfers force to the reaction panel 240 that in turn transfers force to the upper inboard tension location 316b and any other tension locations of the roof 116 and the lower outboard tension location 318b of the side 118 of the vehicle body 110. As this force is transferred, the reaction panel 240 is placed in greater tension between the upper inboard tension location 316b and the lower outboard tension location 318b.

The inflatable cushion 250 may deploy substantially downward from the roof 116 (e.g., from the cross structure 116a). For example, an upper end (not labeled) of the inflatable cushion 250 may be fixedly coupled to the roof 116 at upper locations there along (not labeled), which may be positioned toward the seat back 124 (e.g., rearward in the case of the seats 120 in the rear row 120R) relative to the upper tension locations of the reaction panel 240. When the inflatable cushion 250 is deployed, a passenger-side surface of the airbag (not labeled; e.g., rearward, as shown) is positioned in a fore-aft position directly above the seat bottom 122. As alternatives to being stored in the roof 116 and deploying downward therefrom, the inflatable cushion 250 may instead be stored in and deploy laterally inward from the side 118 (e.g., the pillar structure 118a nearest the seating location), or may be stored in and deployed from the seat 120 (e.g., in the seat back 124 and deploying forward and around the passenger, or in an armrest of the seat 120 and deploying forward of and across the passenger).

In the case of the two deployable restraint systems 230 being associated with the seating positions in a common row (e.g., the rear row 120R), the inflatable cushions 250, when both stored and deployed, do not laterally overlap (i.e., in the inboard-outboard direction) but may be positioned adjacent each other and/or laterally spaced apart from each other.

As shown in FIG. 3B, when deployed, the inflatable cushion 250 may extend below, inboard of, and/or outboard of ends or edges of the reaction panel 240. Alternatively, when deployed, the inflatable cushion 250 may not extend any one or more of below, inboard of, and/or outboard of ends or edges of the reaction panel 240 (e.g., being entirely covered by the reaction panel 240).

Prior to deployment, the inflatable cushion 250 is hidden from view, for example, behind trim panels or other covers associated with the roof 116 (e.g., the cross structure 116a) and/or one of the sides 118 (e.g., a middle one of the pillar structures 118a), such as those same covers or trim panels that hide the reaction panel 240 from view. When stored, the inflatable cushion 250 may be folded (e.g., pleated) and/or rolled to be in a compact elongated form that extends laterally at least partially across the roof 116, for example, being positioned rearward of the reaction panel 240.

The cushion actuator 270 may be any suitable inflator device, such as a pyrotechnic, that deploys the inflatable cushion 250 by inflating the the inflatable cushion 250 with a gas.

In operation, the restraint control system 226 is configured to deploy the reaction panel 240 prior to the inflatable cushion 250, such that the reaction panel 240 is in position to transfer force from the inflatable cushion 250 to the roof 116 and the side 118 of the vehicle body 110 to restrain the passenger during a high acceleration or deceleration event.

In a variation, the deployable restraint system 230 includes the reaction panel 240 and the panel actuator 260 associated therewith but does not include the inflatable cushion 250 or the cushion actuator 270. In such case, the reaction panel 240 and the panel actuator 260, respectively, may instead be referred to as a sail panel or restraint panel and a sail panel actuator or restraint panel actuator. In such case, the sail panel may itself function primarily as a restraint to loose objects (e.g., bags or other possessions of passengers) that might otherwise fly through the passenger compartment 112 (e.g., from the rear row 120R of the seats 120 to the front row 120F during a high acceleration or deceleration event).

Alternatively, the deployable restraint system 230 may include the reaction panel 240, the panel actuator 260, the inflatable cushion 250, and the cushion actuator 270, and in some circumstances deploy both the reaction panel 240 and the inflatable cushion 250 and in other circumstances deploy only the reaction panel 240 (e.g., to itself function as a restraint) but not the inflatable cushion 250. For example, the restraint control system 226 may determine to deploy only the reaction panel 240 if objects but no passenger are detected in the seating position, if a passenger is detected but is out of suitable position for the inflatable cushion 250 to be deployed, if a smaller passenger (e.g., shorter and/or lighter than a 5th percentile adult) is detected, or if a child seat is detected or otherwise known or determined to be in the seating position.

Figure 5:
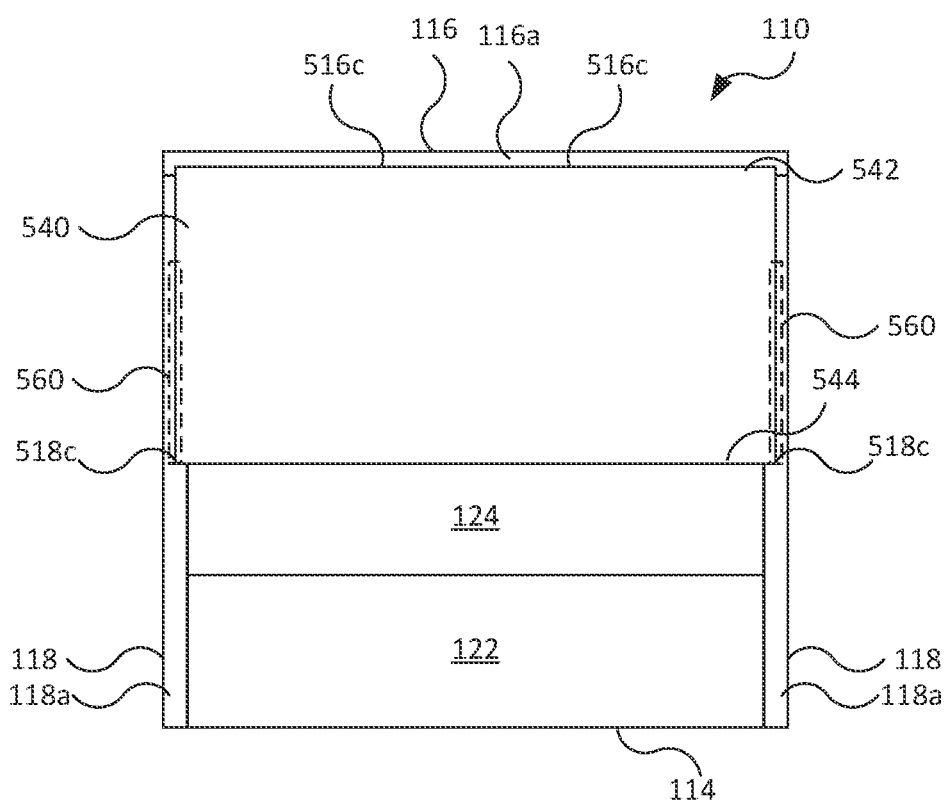
FIG. 5 is the cross-sectional view of the passenger compartment of FIG. 1A with another embodiment of the deployable restraint system.

In another variation illustrated in FIG. 5, the deployable restraint system 230 includes a sail panel 540 that is placed in tension between the roof 116 and the two sides 118 opposite each other. When deployed, the sail panel 540 is placed in tension with an upper end 542 thereof at multiple upper tension locations 516c along the roof 116 (e.g., the roof cross structure 116a extending across the width of the passenger compartment 112) and a lower end 544 thereof at lower outer tension locations 518c on the two sides 118 of the vehicle body 110. The deployable restraint system 230 includes two of the panel actuators 560 (depicted schematically), one for each of the sides 118 of the vehicle body 110. Each of the panel actuators 560 may be configured as described previously for the panel actuator 260. In the non-deployed state, the sail panel 540 may be stored in compact manner along the roof 116. The lower end 544 of the sail panel 540 may be coupled directly to the panel actuators 560 or indirectly via tethers (not shown; see tether 346 described previously). Use of the sail panel 540 may be advantageous for those passenger vehicles 100 with the vehicle body 110 having cross structures 116a and/or pillar structures 118a that are positioned only long distances from the seats 120 (e.g., if having only one middle ones of the cross structure 116a and/or the pillar structures 118a between the front row 120F and the rear row 120R of the seats 120).

Figure 6:
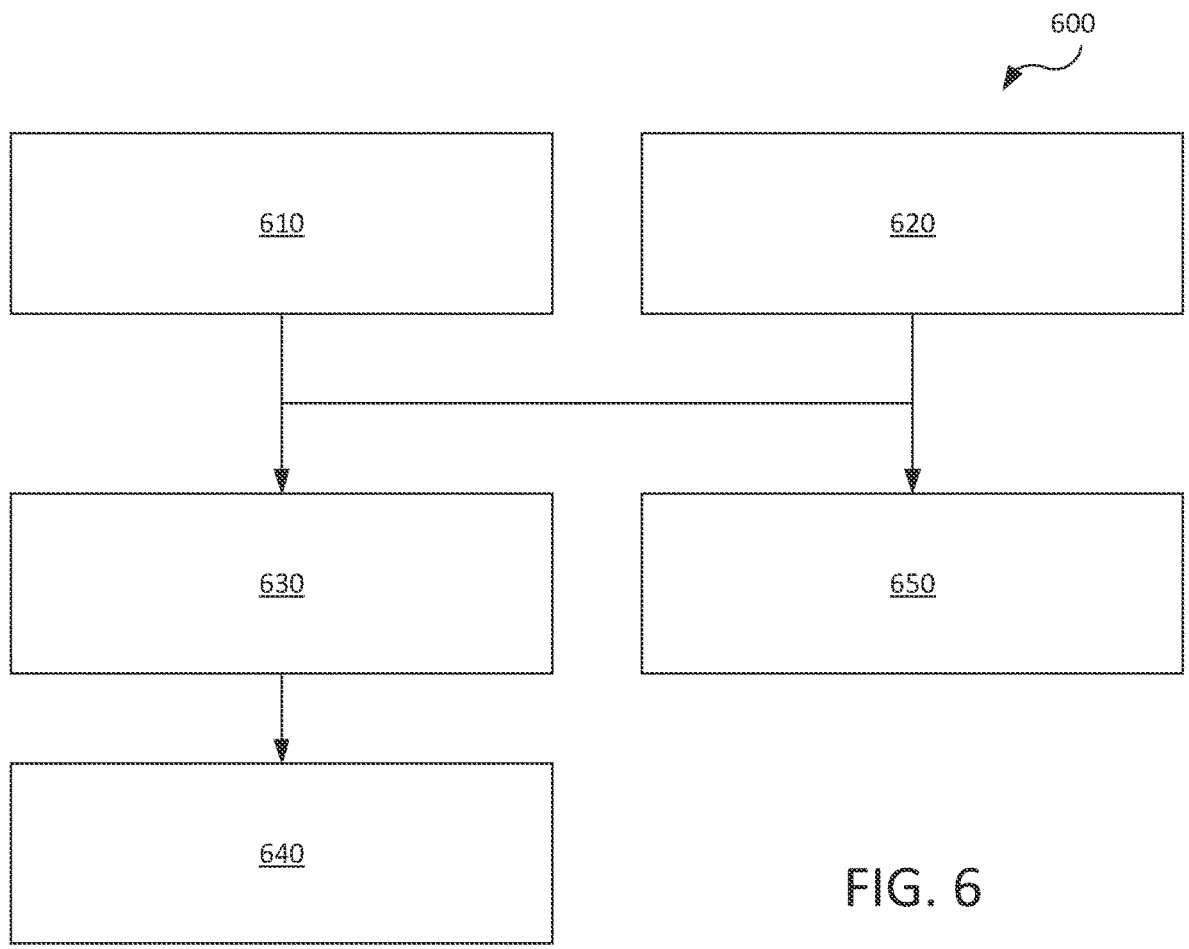
FIG. 6 is a flowchart of a method for restraining a passenger.

Referring to FIG. 6, a method 600 is provided for restraining a passenger in a passenger vehicle. The method 600 generally includes assessing 610 a seating location, assessing 620 motion of the passenger vehicle, deploying 630 a reaction panel, and deploying 640 an inflatable cushion. The method 600 may further include tightening 650 a seatbelt.

The assessing 610 of the seating location includes assessing with a sensor and a controller, such as the passenger sensor 226c and the controller 226b, the seating location, for example, to determine whether the seating location is occupied with a passenger, to classify the passenger (e.g., size and/or position), and/or to determine or identify other seat-related criteria according to which the reaction panel, the inflatable cushion, and/or the seatbelt are operated.

The assessing 620 of the motion of the vehicle includes assessing with a sensor and a controller, such as the motion sensor 226a and the controller 226b, motion of the vehicle, for example, to determine whether the motion satisfies motion criteria indicating a high acceleration event. The assessing 620 of the motion of the vehicle may be performed contemporaneously or after the assessing 610 of the seating location.

The deploying 630 of the reaction panel includes deploying a reaction panel, such as the reaction panel 240 with the panel actuator 260. Upon deployment, the reaction panel may be placed in tension between one or more upper tension locations along a roof of the passenger vehicle and a lower outboard tension location along a side of the passenger vehicle. The deploying 630 is performed upon satisfying the seat-related criteria and the motion criteria.

The deploying 640 of the inflatable cushion includes inflating an inflatable cushion, such as the inflatable cushion 250, with the cushion actuator 270. The inflatable cushion is deployed between the reaction panel and a seat back of a forward-facing seat. The deploying 640 is performed upon satisfying the seat-related criteria and the motion criteria and after the deploying 630 of the reaction panel is initiated.

The tightening 650 of the seatbelt includes tightening a seatbelt, such as the seatbelt 282, with the seatbelt actuator 284. The tightening 650 is performed upon satisfying the seat-related criteria and motion criteria but which may have a lower threshold than for the deploying 630 of the reaction panel or the deploying 640 of the inflatable cushion. The tightening 650 of the seatbelt may be performed before or contemporaneous with the deploying 630 of the reaction panel and/or the deploying 640 of the inflatable cushion.

Figure 7:
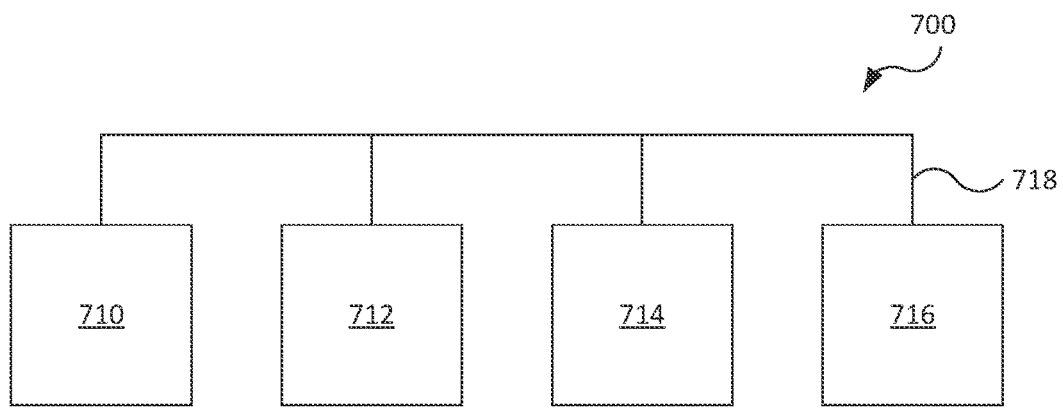
FIG. 7 is a schematic of an example hardware configuration for a controller usable with the deployable restraint systems.

Referring to FIG. 7, an example hardware configuration is depicted and described for a controller 700 (e.g., the controller 226b or controller of the control system 208) used for implementing the systems and methods described herein. The controller 700 is a computing device or system, which may generally include a processor 710, a memory 712, a storage 714, a communications interface 716, and a bus 718 by which the other components are in communication with each other. The processor 710 may be any suitable processor, such as a central processing unit, capable of executing instructions. The memory 712 is a high speed, volatile memory device, such as a random-access memory (RAM) module. The storage 714 is a non-volatile storage device capable of storing instructions and other information executed and otherwise used by the processor 710 (e.g., software programming), such as solid-state memory. The communications interface 716 is capable of receiving signals from and sending signals to various components, such as the various sensors and/or actuators described herein. While one example hardware configuration is disclosed, it should be understood that the controllers used to implement the systems and methods described herein may be of any suitable configuration.

As described above, one aspect of the present technology is the gathering and use of data available from various sources to restrain passengers in vehicles. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to determine whether to deploy the restraints described herein. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of identifying passengers according to which deployment of the restraints is determined, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, operation of restraints may be based on non-personal information data or a bare minimum amount of personal information, such as the content being requested by the device associated with a user, or other non-personal information.

What is claimed is:

1. A deployable restraint system for a vehicle, comprising:
    a reaction panel having a lower end coupled to a lower tension location at a lower half of a first side of the vehicle, an upper end coupled to an upper tension location of a roof of the vehicle at a position closer to a second side of the vehicle than the first side of the vehicle, and an edge that couples the lower end and the upper end, wherein the second side opposes the first side;
    a tether coupling the lower end of the reaction panel and the lower tension location; and
    a panel actuator that moves the tether to the lower tension location to deploy the reaction panel in response to a signal from a sensor indicative of an event of the vehicle.

2. The deployable restraint system of claim 1, wherein when the tether is moved by the panel actuator, the edge of the reaction panel is placed in tension between the upper tension location and the lower tension location.

3. The deployable restraint system of claim 1, wherein the panel actuator includes a pulley, and wherein the pulley engages and draws an intermediate portion of the tether to the lower tension location to place the reaction panel and the tether in tension between the upper tension location and the lower tension location.

4. The deployable restraint system of claim 1, wherein the reaction panel deploys forward of a seat in the vehicle relative to a direction of travel of the vehicle.

5. The deployable restraint system of claim 4, wherein the lower tension location is positioned at a height of a seat bottom of the seat.

6. The deployable restraint system of claim 5, wherein the lower tension location is positioned at a forward edge of the seat bottom relative to the direction of travel of the vehicle.

7. The deployable restraint system of claim 4, further comprising:
    a cushion; and
    a cushion actuator that deploys the cushion between the reaction panel and forward of the seat in the vehicle relative to the direction of travel of the vehicle,
    wherein the reaction panel transfers force from the cushion to the upper tension location and to the lower tension location.

8. A vehicle, comprising:
    a body having first and second sides and a roof having corresponding first and second sides that cooperatively define a passenger compartment;
    a deployable restraint system, comprising:
        a panel coupled to an upper tension location on the first side of the roof;
        a tether coupled to the panel and a lower tension location on the second side of the body; and
        an actuator that moves the tether to deploy the panel,
    wherein an edge of the panel and the tether are placed in tension between the upper tension location on the first side of the roof and the lower tension location on the second side of the body when the tether is moved by the actuator.

9. The vehicle of claim 8, wherein the actuator moves the tether to the lower tension location at a lower half of the second side of the body.

10. The vehicle of claim 8, wherein the actuator includes a pulley, and wherein the actuator winds the tether about the pulley to place the panel and the tether in tension between the second side of the body and the first side of the roof.

11. The vehicle of claim 8, wherein a first end of the tether is coupled to a lower end of the panel and a second end of the tether is coupled to the lower tension location at a lower third of the second side of the body.

12. The vehicle of claim 11, wherein the actuator includes a pulley, and wherein the pulley engages and draws an intermediate portion of the tether to the lower tension location to place the panel and the tether in tension between the second side of the body and the first side of the roof.

13. The vehicle of claim 8, wherein the actuator includes a piston in a cylinder.

14. The vehicle of claim 8, wherein the actuator includes a slider and a runner that traverses a track.

15. A deployable restraint system for a vehicle, comprising:
   a reaction panel;
   a tether coupled to a lower end of the reaction panel;
   a panel actuator that moves the tether to deploy the reaction panel;
   a cushion; and
   a cushion actuator that deploys the cushion,
   wherein the reaction panel transfers force from the cushion to a roof and a single side of the vehicle, and
   wherein the cushion extends below, with respect to the roof, and inboard of, with respect to the single side, inner edges of the reaction panel.

16. The deployable restraint of claim 15, wherein when the tether is deployed, the reaction panel is placed in tension between a first tension location on the single side of the vehicle and a second tension location on the roof of the vehicle.

17. The deployable restraint of claim 16, wherein the first tension location is positioned at a height of a seat bottom of a seat nearest thereto within the vehicle.

18. The deployable restraint of claim 17, wherein the first tension location is positioned at a forward edge of the seat bottom of the seat nearest thereto relative to a forward direction of travel of the vehicle.

19. The deployable restraint of claim 16, wherein the first tension location is positioned forward of a seat back of a seat nearest thereto relative to a forward direction of travel of the vehicle.

20. The deployable restraint of claim 19, wherein the reaction panel and the cushion deploy forward of the seat relative to the forward direction of travel of the vehicle.

* * * * *